US011151735B1

(12) United States Patent
Nakagawa et al.

(10) Patent No.: US 11,151,735 B1
(45) Date of Patent: Oct. 19, 2021

(54) DEFORMATION PROCESSING SUPPORT SYSTEM AND DEFORMATION PROCESSING SUPPORT METHOD

(71) Applicant: KAWASAKI JUKOGYO KABUSHIKI KAISHA, Kobe (JP)

(72) Inventors: Atsuki Nakagawa, Kakogawa (JP); Shinichi Nakano, Suita (JP); Naohiro Nakamura, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 257 days.

(21) Appl. No.: 16/603,139

(22) PCT Filed: Mar. 26, 2018

(86) PCT No.: PCT/JP2018/012009
§ 371 (c)(1),
(2) Date: Oct. 4, 2019

(87) PCT Pub. No.: WO2018/186213
PCT Pub. Date: Oct. 11, 2018

(30) Foreign Application Priority Data

Apr. 6, 2017 (JP) .............................. JP2017-076003

(51) Int. Cl.
G06T 7/521 (2017.01)
G06T 7/593 (2017.01)
G06T 7/564 (2017.01)
B21D 22/18 (2006.01)
(Continued)

(52) U.S. Cl.
CPC ............ G06T 7/521 (2017.01); B21D 11/203 (2013.01); B21D 22/18 (2013.01); G05B 19/4099 (2013.01); G06T 7/564 (2017.01); G06T 7/593 (2017.01); G05B 2219/49184 (2013.01);
(Continued)

(58) Field of Classification Search
CPC ......... G06T 7/521; G06T 7/564; G06T 7/593; G06T 2207/10028; G06T 2207/30164; B21D 11/203; B21D 22/18; G05B 19/4099; G05B 2219/49184
See application file for complete search history.

(56) References Cited

U.S. PATENT DOCUMENTS 5,991,703 A 11/1999 Kase
2002/0107656 A1* 8/2002 Kawano ................. B21D 11/20
702/136

FOREIGN PATENT DOCUMENTS

JP H11-065628 A 3/1999
JP 2004074200 A * 3/2004

* cited by examiner

Primary Examiner — Chan S Park
Assistant Examiner — Daniel C Chang
(74) Attorney, Agent, or Firm — Oliff PLC

(57) ABSTRACT

A deformation processing support system acquires target shape data of a work having a reference line; acquires intermediate shape data from the work in an intermediate shape having a reference line marked thereon; and overlaps the two data on each other by aligning the reference lines relative to each other, to calculate a necessary deformation amount of the work based on a difference between the two data overlapped on each other. To align the reference lines with each other, first and second alignment axes with the same length calculated for the respective reference lines are superimposed on each other. Subsequently, the intermediate shape data is relatively rotated with respect to the target shape data around the first alignment axis.

12 Claims, 10 Drawing Sheets

(51) Int. Cl.
*G05B 19/4099* (2006.01)
*B21D 11/20* (2006.01)
(52) U.S. Cl.
CPC ............... *G06T 2207/10028* (2013.01); *G06T 2207/30164* (2013.01)

TARGET SHAPE DATA

3-D MEASUREMENT DATA

SHOT IMAGE

OVERLAPPING TARGET SHAPE DATA
AND INTERMEDIATE SHAPE DATA

CONTOUR CHART

DEFORMATION PROCESSING SUPPORT SYSTEM AND DEFORMATION PROCESSING SUPPORT METHOD

TECHNICAL FIELD

The present invention relates to a deformation processing support system and a deformation processing support method that each support deformation processing for a work.

BACKGROUND ART

When a large work is deformation-processed, bending processing is traditionally executed for plural times for the work by using, for example, a press processing machine. The overall work is deformation-processed into the target shape by executing the bending processing at each of plural positions on the work.

The work after the deformation processing therefor comes to an end is checked as to whether the work is finished into the target shape, by lapping a wooden mold having a shape that corresponds to the target shape on the work. The wooden mold is divided into plural pieces because the work is large.

Otherwise, the work after the deformation processing therefor comes to an end is checked as to its shape using a 3-D measuring machine. For example, the shape of each of the plural portions of the work is three-dimensionally measured using a 3-D laser scanner. Plural pieces of partial shape data acquired by this measurement are synthesized with each other into one piece to produce overall shape data of the work as described in, for example, Patent Document 1. The work after the deformation processing therefor comes to an end is checked as to whether the work is finished into the target shape based on the produced overall shape data of the work.

PRIOR ART DOCUMENT

Patent Document

Patent Document 1: Japanese Laid-Open Patent Publication No. 11-65628

SUMMARY OF THE INVENTION

Problem to be Solved by the Invention

During the deformation processing for a work (such as, for example, between one bending processing session and the succeeding bending processing session), the deformation amount of the work necessary for the deformation from an intermediate shape to the target shape (a necessary deformation amount) such as, for example, the necessary deformation amount for each of plural positions on the work may be checked. In this case, the necessary deformation amount necessary for deformation into the target shape can be learned by lapping the wooden molds on the work having the intermediate shape and checking any gap between each of the wooden molds and the work. To execute this, the wooden molds each corresponding to any one of the plural portions of the work however need to be lapped on the work, and labor and time therefor are necessary. When the shape of the work is complicated and large, the number of the wooden molds becomes great, and much labor and much time are necessary. The gaps each between a surface edge portion of the wooden molds butting against the work and the work are visually observable while the gaps each between the surface central portion of the wooden mold and the work may be visually unobservable.

On the other hand, the necessary deformation amount for each of the plural positions of the work necessary for deforming into the target shape can be calculated by overlapping intermediate shape data of the work during the deformation processing acquired by a 3-D measuring machine and target shape data of the work on each other and calculating the difference between these two pieces of data.

A "best fit" technique is present as an approach of overlapping the two pieces of shape data. The "best fit" is an approach of detecting plural resembling points between the two pieces of data (feature points) and overlapping the two pieces of data on each other by aligning the two pieces of data relative to each other using the resembling points each as a reference. For example, the resembling point is a hole formed in the work, a corner portion of the work, or a marker attached to the work.

When the curvature significantly differs between the intermediate shape data of the work during the deformation processing and the target shape data, the precision is degraded for the overlapping of the two pieces of data on each other by the "best fit". Otherwise, the overlapping itself may be unable. In the case where no resembling point is present such as the case where no hole is present in the work, where the outer edge of the work is cut off (trimmed off) after the deformation processing comes to an end, or where no marker can be attached to the work because any marker obstacles the deformation processing, the "best fit" itself cannot be executed. The precision is therefore low for the calculation of the necessary deformation amount necessary for deforming into the target shape at each of the plural positions on the work, or the calculation is unable.

An object of the present invention is to highly precisely calculate in a short time period the necessary deformation amount of the work necessary for deforming into the target shape in the deformation processing for the work.

Means for Solving Problem

To solve the technical object, according to an aspect of the present invention, a deformation processing support system calculating a necessary deformation amount necessary for deformation from an intermediate shape of a work to a target shape thereof based on the difference between the intermediate shape and the target shape in deformation processing for the work is provided, that includes:

a target shape data acquiring part that acquires target shape data of the work having a reference line disposed on its surface;

an intermediate shape data acquiring part that acquires intermediate shape data from the work having the intermediate shape and having a reference line marked on its surface, during the deformation processing; and a necessary deformation amount calculating part that overlaps the target shape data and the intermediate shape data on each other by aligning the reference lines relative to each other and that calculates a necessary deformation amount for each of plural positions on the work based on the difference between the target shape data and the intermediate shape data overlapped on each other, and of which as the overlapping of the target shape data and the intermediate shape data on each other, the necessary deformation amount calculating part:

sets a first starting point and a first ending point on the reference line in the intermediate shape data;

calculates a straight-line first alignment axis that connects the first starting point and the first ending point to each other;

sets a second starting point corresponding to the first starting point on the reference line in the target shape data;

calculates a point on the reference line in the target shape data, that is distant from the second starting point by a distance equal to the length of the first alignment axis, as a second ending point;

calculates a straight-line second alignment axis that connects the second starting point and the second ending point to each other;

overlaps the intermediate shape data and the target shape data on each other such that the first alignment axis and the second alignment axis are overlapped on each other in the state where the first starting point and the second starting point match with each other; and relatively rotates the intermediate shape data relative to the target shape data centering the first alignment axis and the second alignment axis overlapped on each other.

According to another aspect of the present invention, a deformation processing support method of calculating a necessary deformation amount necessary for deformation from an intermediate shape of a work to a target shape thereof based on the difference between the intermediate shape and the target shape in deformation processing for the work is provided, that includes the steps of:

acquiring target shape data of the work having a reference line disposed on its surface;

marking a reference line on the surface of the work before the deformation processing is started;

acquiring intermediate shape data from the work having an intermediate shape and having the reference line marked on the surface thereof, during the deformation processing;

overlapping the target shape data and the intermediate shape data on each other by aligning the reference lines relative to each other; and calculating a necessary deformation amount for each of plural positions on the work having the intermediate shape based on the difference between the target shape data and the intermediate shape data overlapped on each other; and, as the overlapping of the target shape data and the intermediate shape data on each other, setting a first starting point and a first ending point on the reference line in the intermediate shape data;

calculating a straight-line first alignment axis that connects the first starting point and the first ending point to each other;

setting a second starting point corresponding to the first starting point on the reference line in the target shape data;

calculating a point on the reference line in the target shape data, that is distant from the second starting point by a distance equal to the length of the first alignment axis, as a second ending point;

calculating a straight-line second alignment axis that connects the second starting point and the second ending point to each other;

overlapping the intermediate shape data and the target shape data on each other such that the first alignment axis and the second alignment axis are overlapped on each other in the state where the first starting point and the second starting point match with each other; and relatively rotating the intermediate shape data relative to the target shape data centering the first alignment axis and the second alignment axis overlapped on each other.

Effect of the Invention

According to the present invention, the necessary deformation amount of a work necessary for deforming the work into the target shape in deformation processing for the work can be highly precisely calculated in a short time period.

MODES FOR CARRYING OUT THE INVENTION

Figure 1:
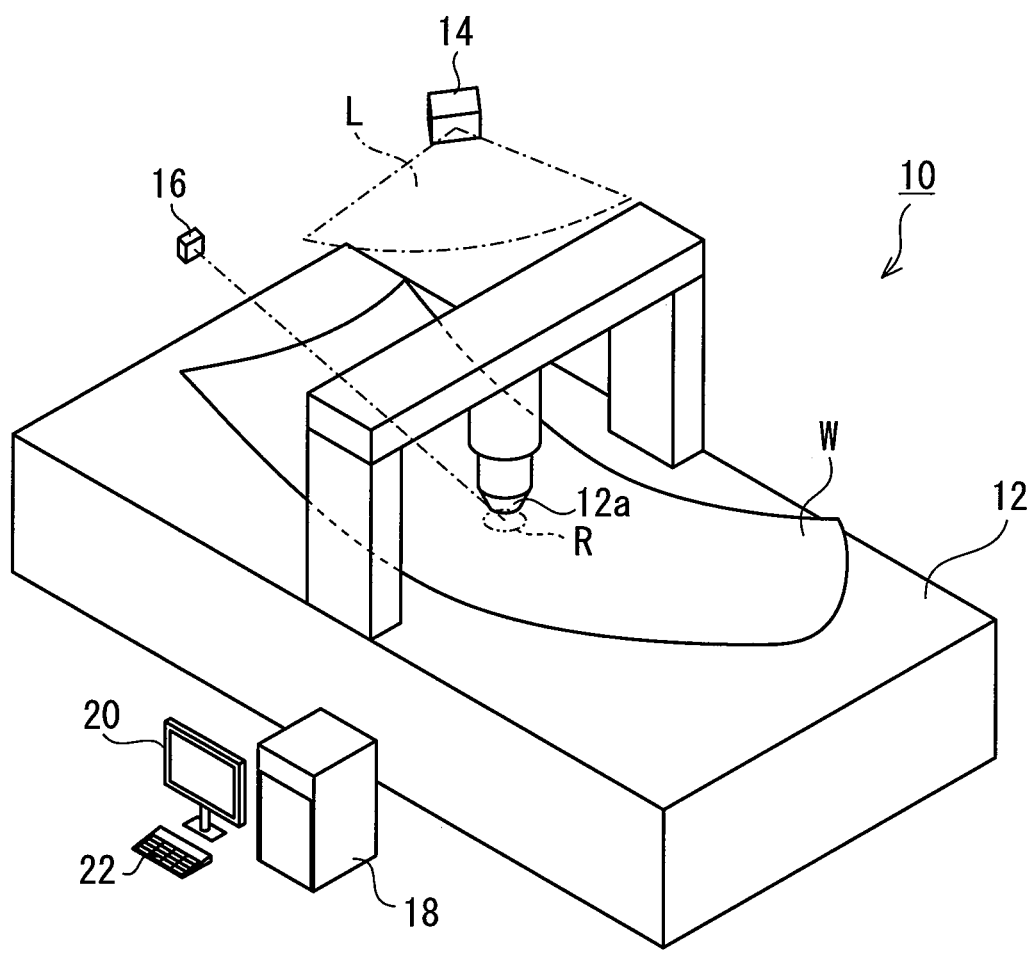
FIG. 1 is a schematic diagram of the configuration of a deformation processing support system according to an embodiment of the present invention.

An aspect of the present invention is a deformation processing support system calculating a necessary deformation amount necessary for deformation from an intermediate shape of a work to a target shape thereof based on the difference between the intermediate shape and the target shape in deformation processing for the work, that includes a target shape data acquiring part that acquires target shape data of the work having a reference line disposed on its surface, an intermediate shape data acquiring part that acquires intermediate shape data from the work having the intermediate shape and having a reference line marked on its surface, during the deformation processing, and a necessary deformation amount calculating part that overlaps the target shape data and the intermediate shape data on each other by aligning the reference lines relative to each other and that calculates the necessary deformation amount for each of plural positions on the work based on the difference between the target shape data and the intermediate shape data overlapped on each other, and of which, as the overlapping of the target shape data and the intermediate shape data on each other, the necessary deformation amount calculating part sets a first starting point and a first ending point on the reference line in the intermediate shape data, calculates a straight-line first alignment axis that connects the first starting point and the first ending point to each other, sets a second starting point corresponding to the first starting point on the reference line in the target shape data, calculates a point on the reference line in the target shape data, that is distant from the second starting point by a distance equal to the length of the first alignment axis, as a second ending point, calculates a straight-line second alignment axis that connects the second starting point and the second ending point to each other, overlaps the intermediate shape data and the target shape data on each other such that the first alignment axis and the second alignment axis are overlapped on each other in the state where the first starting point and the second starting point match with each other, and relatively rotates the intermediate shape data relative to the target shape data centering the first alignment axis and the second alignment axis overlapped on each other.

According to this aspect, the necessary deformation amount for a work necessary for deforming the work into the target shape in deformation processing for the work can be highly precisely calculated in a short time period.

After overlapping the first alignment axis and the second alignment axis on each other, the necessary deformation amount calculating part may parallel-translate the intermediate shape data in the direction perpendicular to the first alignment axis overlapped on the second alignment axis such that a section between the first starting point and the first ending point of the reference line in the intermediate shape data is brought into contact with a section between the second starting point and the second ending point of the reference line in the target shape data.

The deformation processing support system may include, as the intermediate shape data acquiring part, a 3-D laser scanner that three-dimensionally measures the shape of the overall work, a camera that shoots the reference line on the work, a reference line shape data producing part that produces reference line shape data by extracting the reference line from a shot image by the camera, and an intermediate shape data producing part that produces the intermediate shape data by synthesizing 3-D measurement data by the 3-D laser scanner and the reference line shape data with each other.

Otherwise, the deformation processing support system may include, as the intermediate shape data acquiring part, a camera that shoots the work having an intermediate shape from plural directions, and an intermediate shape data producing part that produces the intermediate shape data based on plural pieces of shot image data shot by the camera from the plural directions.

The deformation processing support system may include a contour chart producing part that produces a contour chart based on the necessary deformation amount for each of the plural positions on the work calculated by the necessary deformation amount calculating part. A worker can variously study to finish the work W into the target shape by referring to the contour chart. As a result, the work W is highly efficiently finished into the target shape in a short time period.

Plural reference lines may be disposed by disposing grid lines on the overall surface in the target shape data and on the overall surface of the work. The target shape data and the intermediate shape data are thereby overlapped on each other by alignment using the reference lines at a position at which no more bending processing can be executed for the reason such as, for example, a small thickness and the deformation amount can thereby be calculated that is necessary for deforming into the target shape at each of the other positions on the work. The degree of freedom is therefore improved concerning the manner of the deformation processing for the work compared to the case where the reference line is disposed in a portion of the surface of each of the target shape data and the work.

Another aspect of the present invention is a deformation processing support method of calculating the necessary deformation amount necessary for deformation from an intermediate shape of a work to a target shape thereof based on the difference between the intermediate shape and the target shape in deformation processing for the work, that includes the steps of acquiring target shape data of the work having a reference line disposed on its surface, marking a reference line on the surface of the work before the deformation processing is started, acquiring intermediate shape data from the work having the intermediate shape and having the reference line marked on its surface during the deformation processing, overlapping the target shape data and the intermediate shape data on each other by aligning the reference lines relative to each other, and calculating the necessary deformation amount for each of plural positions on the work having the intermediate shape based on the difference between the target shape data and the intermediate shape data overlapped on each other, and, as the overlapping of the target shape data and the intermediate shape data on each other, setting a first starting point and a first ending point on the reference line in the intermediate shape data, calculating a straight-line first alignment axis that connects the first starting point and the first ending point to each other, setting a second starting point corresponding to the first starting point on the reference line in the target shape data, calculating a point on the reference line in the target shape data, that is distant from the second starting point by a distance equal to the length of the first alignment axis, as a second ending point, calculating a straight-line second alignment axis that connects the second starting point and the second ending point to each other, overlapping the intermediate shape data and the target shape data on each other such that the first alignment axis and the second alignment axis overlap on each other in the state where the first starting point and the second starting point match with each other, and relatively rotating the intermediate shape data relative to the target shape data centering the first alignment axis and the second alignment axis overlapped on each other.

According to the other aspect, the necessary deformation amount for the work necessary for deforming the work into the target shape in the deformation processing for the work can be highly precisely calculated in a short time period.

After the first alignment axis and the second alignment axis are overlapped on each other, the intermediate shape data may be parallel-translated in the direction perpendicular to the first alignment axis overlapped on the second alignment axis such that a section between the first starting point and the first ending point of the reference line in the intermediate shape data is brought into contact with a section between the second starting point and the second ending point of the reference line in the target shape data.

To acquire the intermediate shape data, the intermediate shape data may be produced by three-dimensionally measuring the shape of the overall work using the 3-D laser scanner, shooting the reference line on the work using the camera, producing the reference line shape data by extracting the reference line from the shot image by the camera, and synthesizing the three-dimensionally measured data by the 3-D laser scanner and the reference line shape data with each other.

Otherwise, to acquire the intermediate shape data, the intermediate shape data may be produced based on the plural pieces of shot image data on the work having the intermediate shape shot from the plural directions by the camera.

A contour chart may be produced based on the necessary deformation amount calculated for each of the plural positions on the work. A worker can variously study to finish the work W into the target shape by referring to the contour chart. As a result, the work W is highly efficiently finished into the target shape in a short time period.

Plural reference lines may be disposed by disposing grid lines on the overall surface in the target shape data and on the overall surface of the work. The target shape data and the intermediate shape data are thereby overlapped on each other by alignment using the reference lines at a position at which no more bending processing can be executed for the reason such as, for example, a small thickness and the deformation amount can thereby be calculated that is necessary for deforming into the target shape for each of the other positions on the work. The degree of freedom is improved concerning the manner of the deformation processing for the work compared to the case where the reference line is disposed in a portion of the surface of each of the target shape data and the work.

An embodiment of the present invention will be described below with reference to the drawings.

Figure 2:
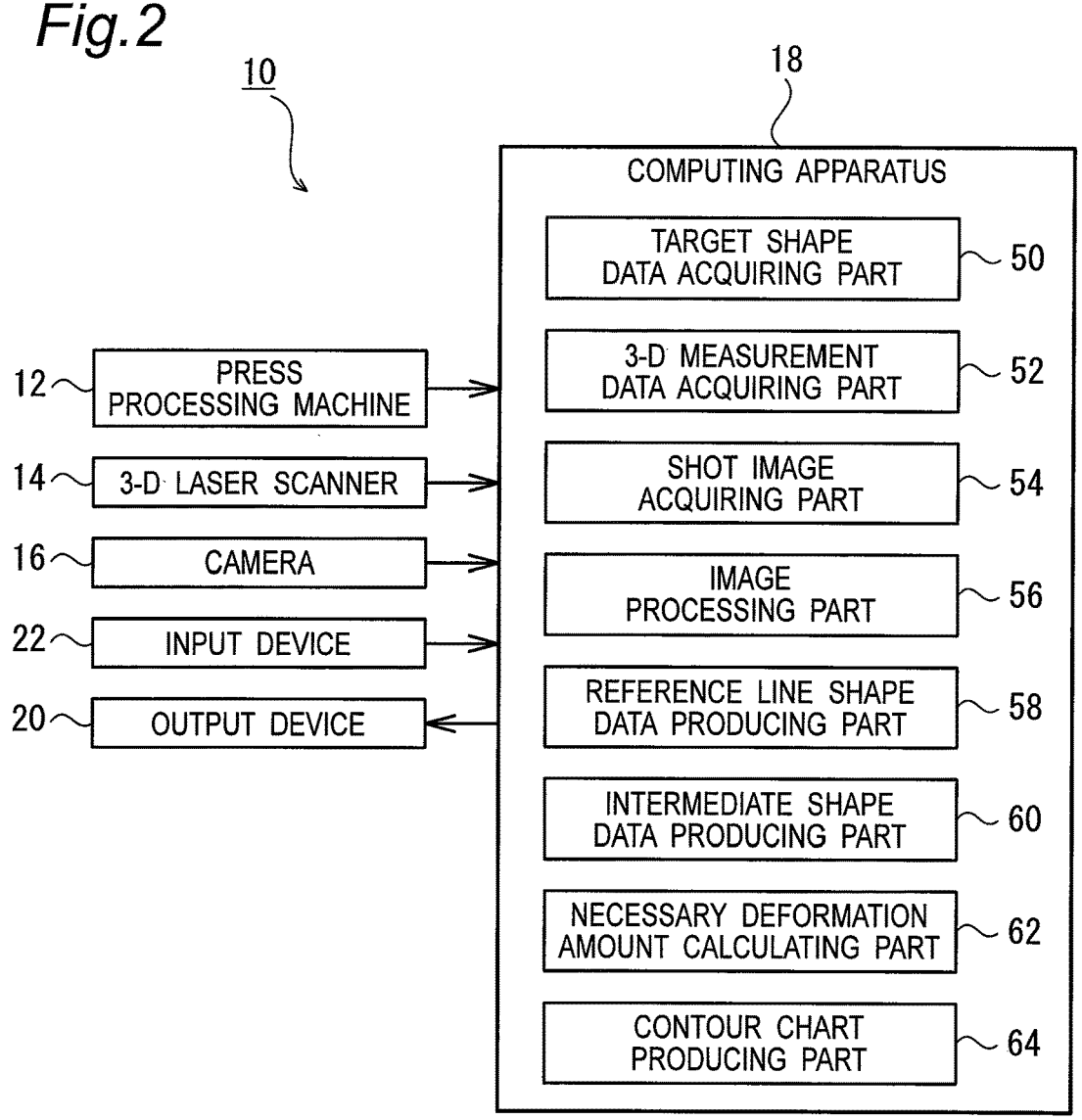
FIG. 2 is a block diagram of the deformation processing support system.

FIG. 1 schematically depicts the configuration of a deformation processing support system according to an embodiment of the present invention. FIG. 2 is a block diagram of the deformation processing support system.

The overview of the deformation processing support system 10 according to this embodiment depicted in FIG. 1 and FIG. 2 will be described. The deformation processing support system 10 according to this embodiment is a system that supports deformation processing for a work W in which plural bending processing sessions are executed for the work W. For example, describing the details later, the deformation processing support system 10 is a system that calculates a necessary deformation amount necessary for deformation from an intermediate shape to a target shape based on the intermediate shape (data) of the work W during the deformation processing and the target shape (data) of the work W.

In this embodiment, the work W before the deformation processing is started has a flat-plate shape. The work W is produced from an aluminum material. In this embodiment, the plural bending processing (the deformation processing) sessions for the work W are executed by a press processing machine 12.

The press processing machine 12 presses downward the work W at each of plural positions of the work W using an upper side punch 12a and thereby executes the bending processing for the position. The overall work W is finally deformation-processed into the target shape by sequentially executing the bending processing for the plural positions of the work W.

In this deformation processing for the work W, during the deformation processing at a position or during a time period between the end of the bending processing for a position and the start of the bending processing for another position, a worker may desire to know the deformation amount of the work W necessary for deformation from the intermediate shape to the target shape, that is, the necessary deformation amount for each of the plural positions on the work W. The deformation processing support system 10 of this embodiment calculates the deformation amount for each of the plural positions on the work W necessary for deformation from the intermediate shape to the target shape.

The deformation processing support system 10 of this embodiment includes a 3-D laser scanner 14 that measures the shape (a 3-D shape) of the work W during the deformation processing, a camera 16 that shoots the work W during the deformation processing, and a computing apparatus 18.

The 3-D laser scanner 14 is a non-contact 3-D measuring machine that scans the overall work W, that measures the distance to the work W based on a reflected light beam from the work W, and that three-dimensionally measures the shape of the work W based on the measured distance. The 3-D laser scanner 14 three-dimensionally measures the overall work W having an intermediate shape after the bending processing is executed for the work W for a predetermined times or at an optional timing designated by a worker, that is, when the upper side punch 12a of the press processing machine 12 is away from the work W. The 3-D measurement data thereof is sent to the computing apparatus 18.

In this embodiment, the camera 16 partially shoots the work W. The camera 16 shoots, for example, a region R of the work W positioned immediately under the upper side punch 12a of the press processing machine 12. When the upper side punch 12a of the press processing machine 12 is away from the work W, the camera 16 shoots the region R of the work W having the intermediate shape immediately after being bending-processed by the upper side punch 12a or immediately before being bending-processed thereby, as a shot region R. The shot image (data) by the camera 16 is sent to the computing apparatus 18. Describing the reason later, it is preferred that the camera 16 have a sensitivity that is as high as possible.

As depicted in FIG. 2, the computing apparatus 18 is connected to the press processing machine 12, the 3-D laser scanner 14, and the camera 16. When the computing apparatus 18 receives a signal (a bending processing end signal) indicating that the upper side punch 12a leaves the work W, from the press processing machine 12, the computing apparatus 18 sends a measurement execution signal to the 3-D laser scanner 14 and sends a shooting execution signal to the camera. The computing apparatus 18 acquires the 3-D measurement data of the work W having the intermediate shape, from the 3-D laser scanner 14 executing the 3-D measurement, and acquires the shot image data of the work W having the intermediate shape, from the camera 16 executing the shooting. The computing apparatus 18 calculates the necessary deformation amount necessary for deformation from the intermediate shape to the target shape for each of the plural positions on the work W based on those pieces of data. In this embodiment, the computing apparatus 18 is configured to output the calculated necessary deformation amount to the worker through an output device 20 (such as, for example, a display). The computing apparatus 18 will hereinafter be described in detail.

As depicted in FIG. 2, the computing apparatus 18 includes a target shape data acquiring part 50 acquiring the target shape data of the work W, a 3-D measurement data acquiring part 52 acquiring the 3-D measurement data of the work W from the 3-D laser scanner 14, a shot image acquiring part 54 acquiring the shot image of the work W from the camera 16, an image processing part 56 image-processing the acquired shot image, a reference line shape data producing part 58 producing the reference line shape data from the image-processed shot image, an intermediate shape data producing part 60 producing the intermediate shape data based on the 3-D measurement data and the reference line shape data, a necessary deformation amount calculating part 62 calculating the necessary deformation amount of the work W necessary for deformation from the intermediate shape to the target shape, and a contour chart producing part 64 producing a contour chart based on the calculated necessary deformation amount. For example, the computing apparatus 18 is a computer including a CPU and a storage medium, and functions as the 3-D measurement data acquiring part 52, the shot image acquiring part 54, the image processing part 56, the reference line shape data producing part 58, the intermediate shape data producing part 60, the necessary deformation amount calculating part 62, and the contour chart producing part 64 by operations of the CPU in accordance with a program in the storage medium.

Figure 3:
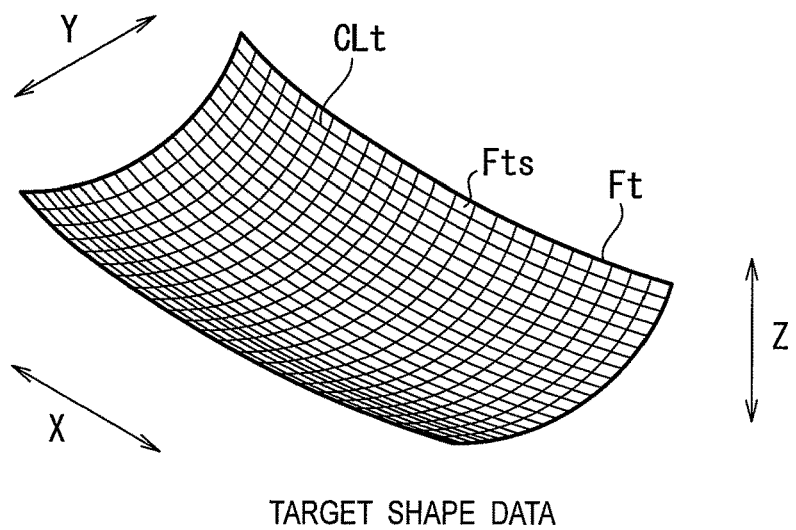
FIG. 3 is a diagram of target shape data.

As depicted in FIG. 3, the target shape data acquiring part 50 of the computing apparatus 18 acquires the target shape data Ft of the work W. The target shape data Ft is 3-D CAD data indicating, for example, the shape of the finished product of the work W, that is, the shape acquired after the deformation processing comes to an end. The target shape data acquiring part 50 acquires the 3-D CAD data from, for example, a CAD apparatus (not depicted) connected to the computing apparatus 18. An X-direction, a Y-direction, and a Z-direction depicted in FIG. 3 respectively indicate a width direction, a depth direction, and a thickness direction of the work W when the work W has a flat-plate shape.

Describing the reason later, the target shape data Ft of the work W includes a reference line CLt on the surface Fts thereof (the surface corresponding to the surface Ws of the actual work W pressed by the upper side punch 12a of the press processing machine 12). In this embodiment, the plural reference lines CLt are arranged in a grid form.

Figure 4:
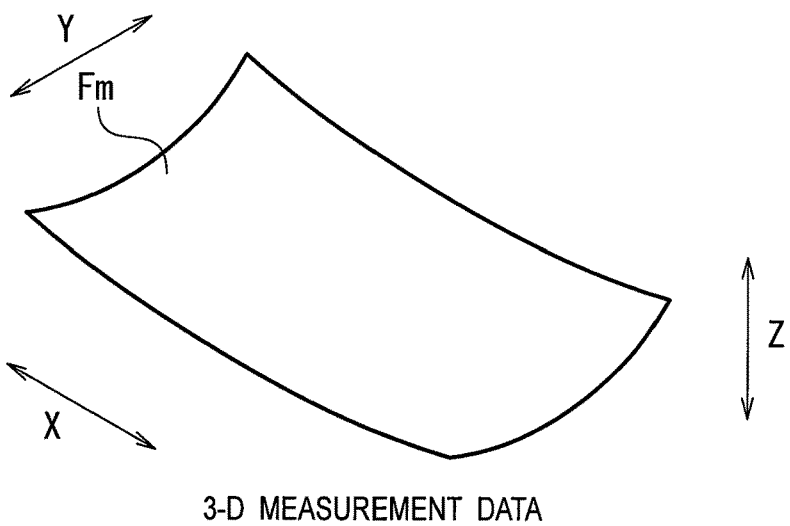
FIG. 4 is a diagram of 3-D measurement data.

As depicted in FIG. 4, the 3-D measurement data acquiring part 52 of the computing apparatus 18 acquires the 3-D measurement data Fm of the work W from the 3-D laser scanner 14. The 3-D measurement data Fm is, for example, point group data.

Figure 5:
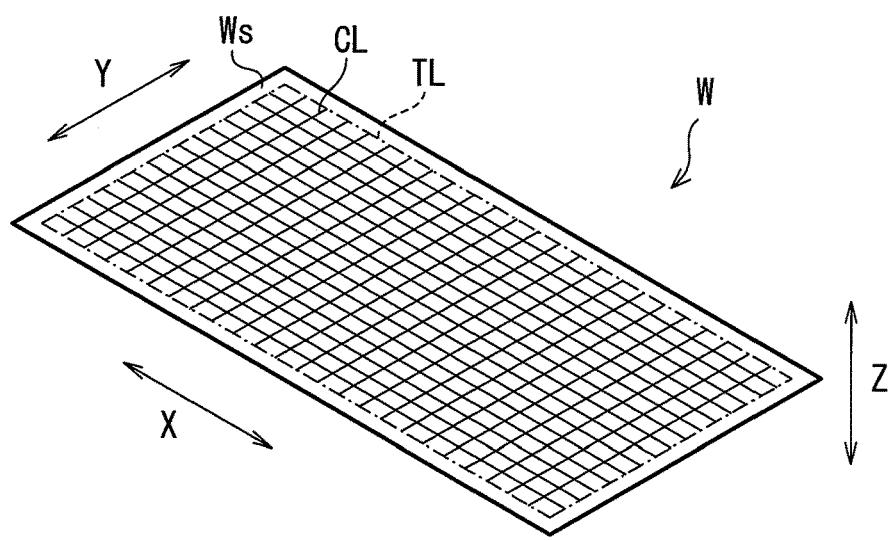
FIG. 5 is a diagram of a work before deformation processing is started.

As depicted in FIG. 5, describing the reason later, a reference line CL is marked on the surface Ws of the actual work W pressed by the upper side punch 12a of the press processing machine 12. In this embodiment, the plural reference lines CL are arranged in a grid form. For example, the plural reference lines CL are scribed lines maintained during the deformation processing without being erased.

As depicted in FIG. 4, the 3-D measurement data Fm of the work W measured by the 3-D laser scanner 14 however does not have the plural reference lines CL appearing therein. The 3-D laser scanner 14 cannot detect the grid lines (the plural reference lines CL) because the recesses and the protrusions of the grid lines marked on the surface Ws of the work W are small, and the 3-D measurement data Fm does substantially not have the grid lines appearing therein. To cope with this, describing the reason later, the camera 16 partially shoots the work W.

The plural reference lines CLt arranged in the grid form on the surface Fts in the target shape data Ft and the plural reference lines CL arranged in the grid form on the surface Ws of the work W substantially correspond to each other. For example, the pitch of the reference lines on the work W is set to be small compared to the pitch of the reference lines in the target shape data Ft taking into consideration the stretch generated when the work W is deformation-processed from the flat-plate shape to the target shape.

Figure 6:
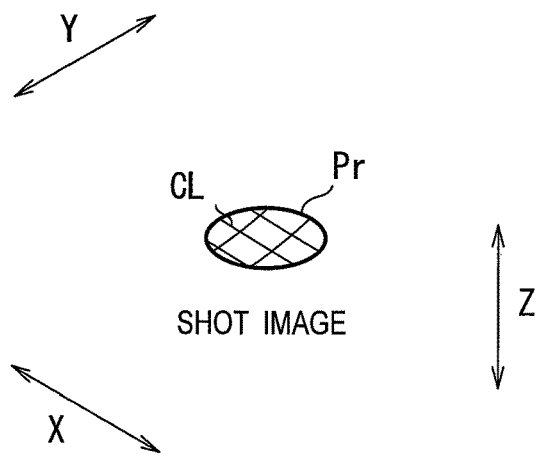
FIG. 6 is a diagram of a shot image by a camera.

As depicted in FIG. 6, the shot image acquiring part 54 of the computing apparatus 18 acquires the shot image Pr of the work W from the camera 16. In this embodiment, the camera 16 shoots the shot region R immediately under the upper side punch 12a of the press processing machine 12 as depicted in FIG. 1 and the shot image Pr is therefore a partial shot image of the work W. As depicted in FIG. 6, the shot image Pr shows the plural reference lines CL in the grid form marked on the surface Ws of the work W.

The image processing part 56 of the computing apparatus 18 image-processes the shot image Pr to extract the reference lines CL shown in the shot image Pr by the camera 16. The image processing part 56 executes, for example, adjustment of the brightness and the contrast, the contour enhancement correction, and the like for the shot image Pr. The adjustment of the parameters such as the brightness and the contrast in the image processing may be set to be executable by the worker through an input device 22 (such as, for example, a keyboard) connected to the computing apparatus 18. To realize this, the computing apparatus 18 outputs the shot image Pr by the camera 16 to the worker through the output device 20.

Figure 7:
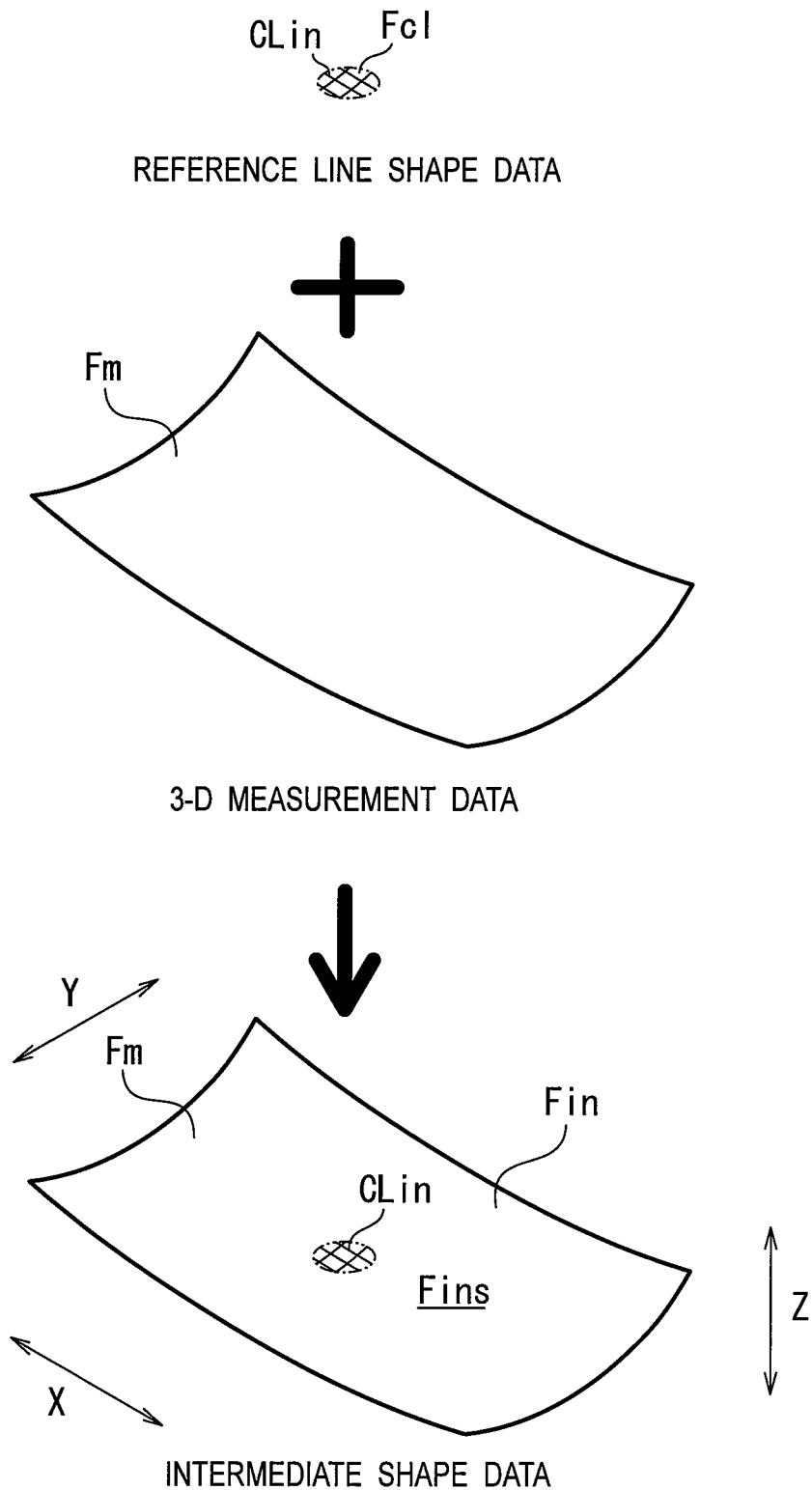
FIG. 7 is a diagram for explaining production of intermediate shape data.

As depicted in FIG. 7, the reference line shape data producing part 58 of the computing apparatus 18 extracts the reference line CL shown in the image-processed shot image Pr by the camera 16 and thereby produces the reference line shape data Fcl. The reference line shape data Fcl is 3-D shape data and is produced from the 2-D shot image Pr based on the positional relation between the camera 16 and the shot region R thereof. To highly precisely produce the reference line shape data Fcl, the plural cameras 16 may be used. The plural cameras 16 each shoot the shot region R common thereto from a direction different from that of each other, and the 3-D reference line shape data Ed is produced from the plural shot images whose shooting directions are each different from each other.

As depicted in FIG. 7, the intermediate shape data producing part 60 of the computing apparatus 18 synthesizes the 3-D measurement data Fm acquired from the 3-D laser scanner 14 by the 3-D measurement data acquiring part 52 and the reference line shape data Fcl with each other. The shape data (the intermediate shape data) Fin of the work W having the intermediate shape and partially including reference line CLin on a surface Fins is produced by the above synthesis. The reference line shape data Fcl is arranged on the intermediate shape data Fin to correspond to the relative position of the shot region R by the camera 16 relative to the overall work W, based on the relative positional relation between the 3-D laser scanner 14 and the camera 16.

The necessary deformation amount calculating part 62 of the computing apparatus 18 calculates the necessary deformation amount necessary for deformation from the intermediate shape to the target shape for each of the plural positions on the work W based on the target shape data Ft obtained by the target shape data acquiring part 50 and the intermediate shape data Fin produced by the intermediate shape data producing part 60.

Figure 8:
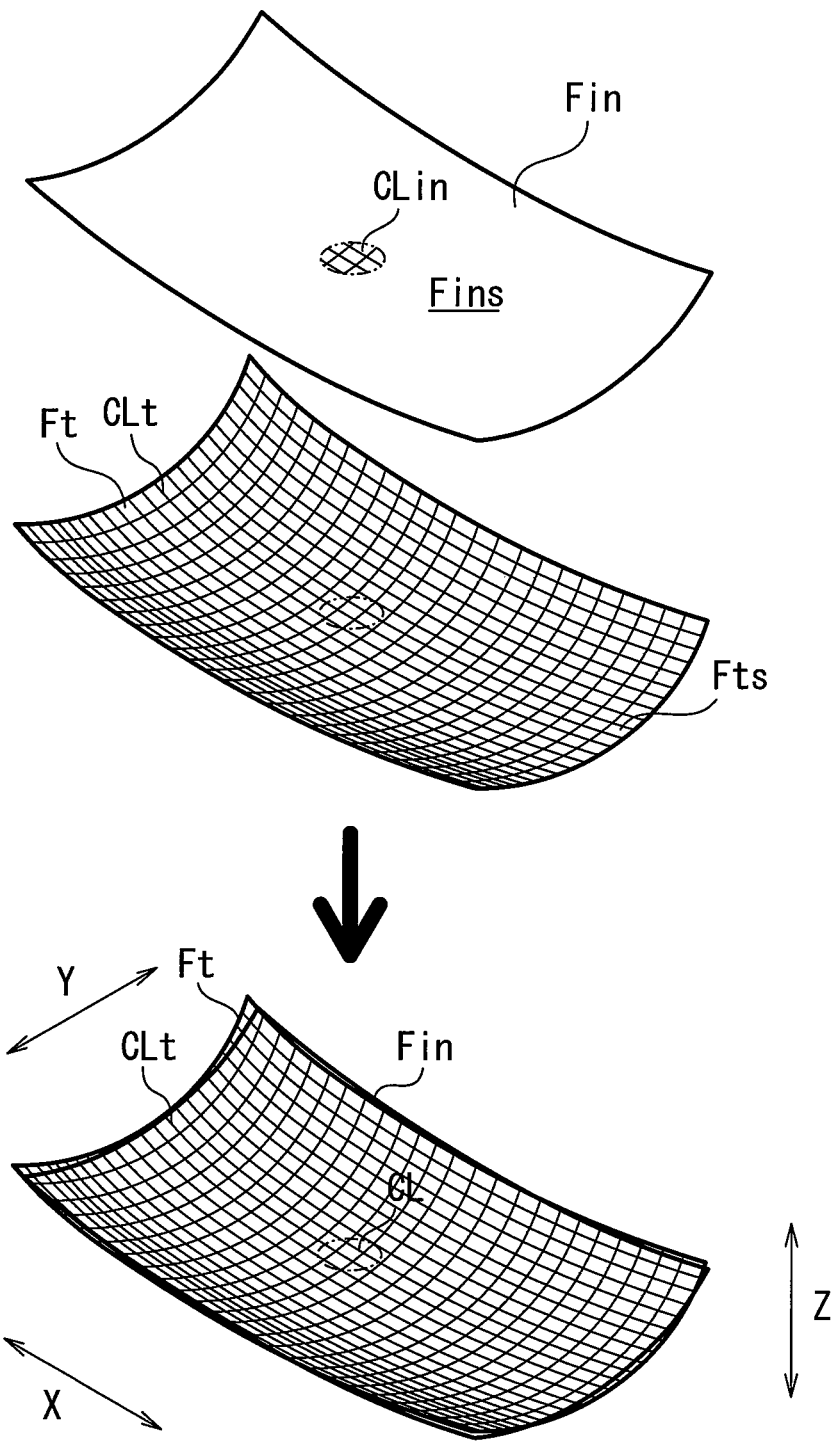
FIG. 8 is a diagram of overlapping of the intermediate shape data on the target shape data.

To describe, as depicted in FIG. 8, the necessary deformation amount calculating part 62 aligns the reference line CLin in the intermediate shape data Fin and the corresponding reference line CLt in the target shape data Ft relative to each other and thereby executes a process of overlapping the intermediate shape data Fin on the target shape data Ft (an overlapping process).

To align the reference line CLin in the intermediate shape data Fin and the corresponding reference line CLt in the target shape data Ft relative to each other, each of the plural reference lines CL on the work W and each of the reference lines CLt in the target shape data Ft are configured to be distinguishable from each other. For example, the reference lines are different in the thickness, the shape, the color (such as, for example, a dotted line) and the like. For example, a reference symbol is attached to each of the reference lines (in the case of the work W, a character such as a digit or an alphabet, or a symbol is marked). The reference line CLin in the intermediate shape data Fin and the corresponding reference line CLt in the target shape data Ft are thereby identified.

Instead, when the output device 20 is a display, the worker may instruct the reference line CLt in the target shape data Ft corresponding to the reference line CLin in the intermediate shape data Fin to the computing apparatus 18 through the input device 22, on the screen of the display.

For supplement, the shape of the reference line CLin in the intermediate data Fin and the shape of the corresponding reference line CLt in the target shape data Ft are different from each other to be exact. The overall reference line CLin in the intermediate shape data Fin and the overall corresponding reference line CLt in the target shape data Ft therefore do not completely overlap on each other.

The alignment of the reference line CLin in the intermediate shape data Fin and the reference line CLt in the target shape data Ft with each other will hereinafter be described taking an example and with reference to FIGS. 9A to 9E.

Figure 9A:
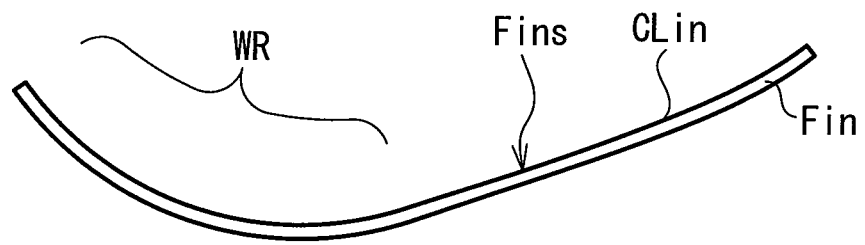
FIG. 9A is a diagram of a procedure for overlapping the intermediate shape data on the target shape data.
Figure 9A:
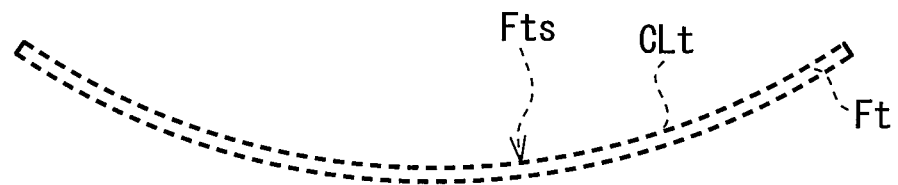

FIG. 9A depicts a cross-section of the intermediate shape data Fin taken by cutting along a plane along the one reference line CLin on the surface Fins (that is, including the reference line CLin), and a cross-section of the target shape data Ft taken by cutting along a plane along the corresponding reference line CLt on the surface Fts (that is, including the reference line CLt). The cross-sections of the pieces of shape data are depicted to facilitate the understanding and these cross-sections are not necessary for the alignment of the reference lines.

As depicted in FIG. 9A, the reference line CLin in the intermediate shape data Fin and the reference line CLt in the target shape data Ft are different in the shape. The reference line CLin in this case is a reference line passing through a processing region (processing scheduled region) WR scheduled to be pressed by the upper side punch 12a of the press processing machine 12 from now, that is, the processing scheduled region WR for which the difference between the target shape and the intermediate shape needs to be learned for this processing.

Figure 9B:
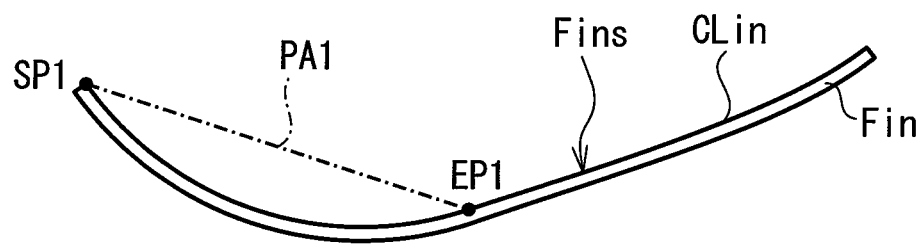
FIG. 9B is a diagram of the procedure for overlapping the intermediate shape data on the target shape data, continued from that in FIG. 9A.
Figure 9B:
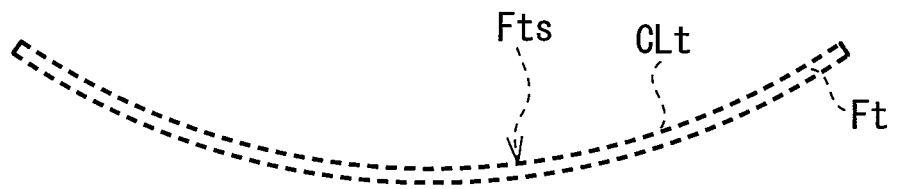

To align the reference line CLin in the intermediate shape data Fin and the corresponding reference line CLt in the target shape data Ft differing in the shape as depicted in FIG. 9A with each other, a first starting point SP1 and a first ending point EP1 are first set on the reference line CLin in the intermediate shape data Fin as depicted in FIG. 9B.

It is preferred that the first starting point SP1 and the first ending point EP1 be set such that a section between the first starting point SP1 and the first ending point EP1 on the reference line CLin in the intermediate shape data Fin is included in a region for which the difference between the target shape and the actual intermediate shape needs to be learned (such as, for example, the processing scheduled region WR).

The determination of the reference line CLin in the intermediate shape data Fin to be aligned and the setting of the first starting point SP1 and the first ending point EP1 may be executed by the worker through the input device 22 by urging the worker using the computing apparatus 18 through the output device 20 for the determination and the setting.

Instead, the worker designates the position on the work W to be next pressed by the upper side punch 12a (the processing scheduled region WR) through the input device 22. The worker may designate, for example, a region in the intermediate shape data Fin displayed on the output device 20 as the processing scheduled region WR through the input device 22. The computing apparatus 18 may determine the reference line CLin passing through the processing scheduled region WR and set the first starting point SP1 and the first ending point EP1 to be included in the processing scheduled region WR, based on the designation.

As depicted in FIG. 9B, a straight-line first alignment axis PA1 connecting the first starting point SP1 and the first ending point EP1 is next calculated. The first alignment axis PA1 is a line. The computing apparatus 18 calculates the direction for the first alignment axis PA1 to extend in and the length thereof based on, for example, the coordinates of the first starting point SP1 and the coordinates of the first ending point EP1.

Figure 9C:
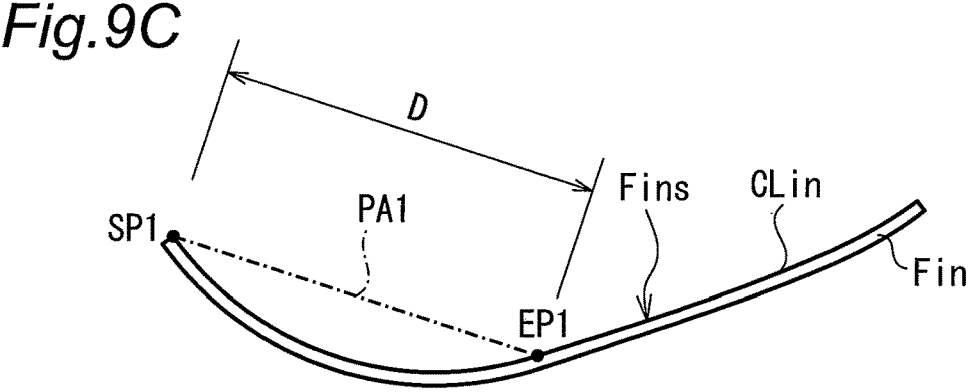
FIG. 9C is a diagram of the procedure for overlapping the intermediate shape data on the target shape data, continued from that in FIG. 9B.

As depicted in FIG. 9C, a second starting point SP2 corresponding to the first starting point SP1 is set on the reference line CLt in the target shape data Ft. The second starting point SP2 may be set by the worker through the input device 22. The worker designates, for example, a point on the reference line CLt in the target shape data Ft displayed on the output device 20, through the input device 22 and the second starting point SP2 is thereby set.

Instead, in the case where the first starting point SP1 is set at an intersection point of the plural reference lines CLin, the computing apparatus 18 may identify the two reference lines CLin in the intermediate shape data Fin that intersect each other to form the first starting point SP1, may identify the two reference lines CLt in the target shape data Ft corresponding to the identified two reference lines CLin, and may set the intersection of the identified two reference lines CLt as the second starting point SP2.

When the second starting point SP2 is set, the computing apparatus 18 calculates the second ending point EP2 based on the length D of the first alignment axis PA1 and the second starting point SP2. The second ending point EP2 is set on the reference line CLt distant from the second starting point SP2 by the distance D. The second ending point EP2 is an intersection formed by a circle centering the second starting point SP2 and having a radius D, and the reference line CLt, and can geometrically be calculated.

Figure 9D:
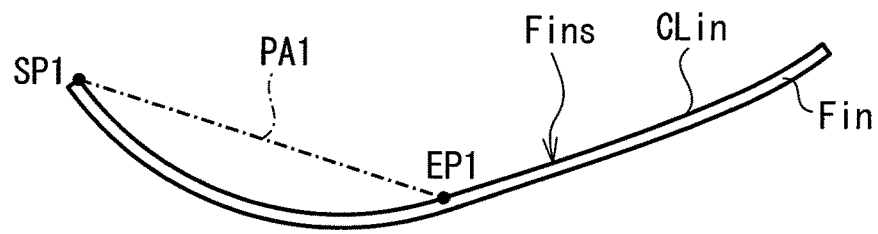
FIG. 9D is a diagram of the procedure for overlapping the intermediate shape data on the target shape data, continued from that in FIG. 9C.

When the second ending point EP2 is calculated, the computing apparatus 18 calculates the straight-line second alignment axis PA2 connecting the second starting point SP2 and the second ending point EP2 to each other as depicted in FIG. 9D. The second alignment axis PA2 is a line having the length equal to the length D of the first alignment axis PA1. For example, the computing apparatus 18 calculates the direction for the second alignment axis PA2 to extend in and the length thereof based on the coordinates of the second starting point SP2 and the coordinates of the second ending point EP2.

Figure 9E:
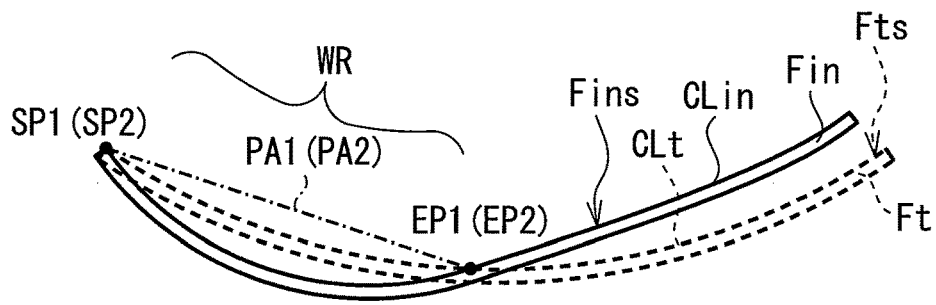
FIG. 9E is a diagram of the procedure for overlapping the intermediate shape data on the target shape data, continued from that in FIG. 9D.

When the second alignment axis PA2 is calculated, the computing apparatus 18 aligns the first alignment axis PA1 and the second alignment axis PA with each other and thereby overlaps the intermediate shape data Fin and the target shape data Ft on each other as depicted in FIG. 9E. For example, in the state where the first starting point SP1 and the second starting point SP2 match with each other, the first alignment axis PA1 and the second alignment axis PA2 are aligned relative to each other to be overlapped on each other. The first alignment axis PA1 and the second alignment axis PA2 each have the length D equal to that of each other and therefore can completely be overlapped on each other. The first alignment axis PA1 and the second alignment axis PA2 are highly precisely aligned relative to each other as above and the reference line CLin in the intermediate shape data Fin and the reference line CL in the target shape data Ft are thereby highly precisely aligned relative to each other.

Even when the first alignment axis PA1 and the second alignment axis PA2 are completely overlapped on each other, as depicted in FIG. 9E, the reference lines CLin and CLt are not always overlapped on each other. The computing apparatus 18 is therefore configured to execute the best fit process by rotating the intermediate shape data Fin (the reference line CLin) centering the first alignment axis PA1 overlapped on the second alignment axis PA2. This best fit process aligns the reference lines CLin and CLt relative to each other such that the section between the first starting point SP1 and the first ending point EP1 of the reference line CLin in the intermediate shape data Fin and the section between the second starting point SP2 and the second ending point EP2 of the reference line CLt in the target shape data Ft substantially match with each other in the 3-D space. The phrase "to substantially match" as used herein refers to "to completely match" or "to match to the extent that a difference is present and the difference is in an acceptable range".

When the intermediate shape data Fin are properly overlapped on the target shape data Ft by aligning their reference lines CLin and CLt relative to each other, the necessary deformation amount calculating part 62 calculates the necessary deformation amount necessary deforming from the intermediate shape to the target shape for each of the plural positions on the work W.

For example, as depicted in FIG. 9E, the necessary deformation amount calculating part 62 calculates the distance between each of the plural positions in the intermediate shape data Fin and the corresponding position in the target shape data Ft as the necessary deformation amount necessary for deforming into the target shape for the corresponding position on the work W based on the difference between the intermediate shape data Fin and the target shape data Ft overlapped on each other.

Figure 10:
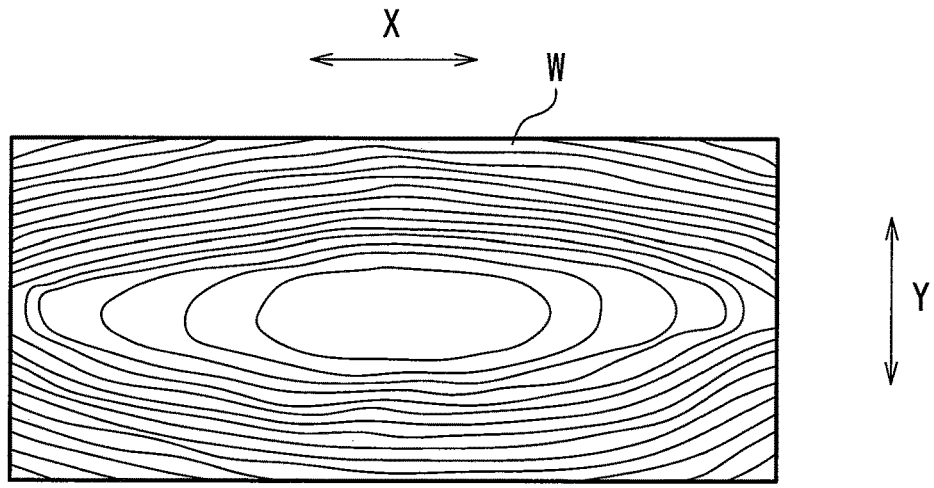
FIG. 10 is a diagram of a contour chart.

As depicted in FIG. 10, the contour chart producing part 64 of the computing apparatus 18 produces a contour chart (a contour plot) based on the necessary deformation amount necessary for deforming into the target shape for each of the plural positions on the work W calculated by the necessary deformation amount calculating part 62. In the contour chart, a portion whose necessary deformation amount is zero is represented by a height of zero, that is, the height of the surface Fts in the target shape data Ft is zero. In the contour chart, a portion of the work W whose necessary deformation amount is larger is represented by a higher level. The produced contour chart is output to the worker through the output device 20. The worker can variously study to finish the work W into the target shape, by referring to the contour chart. As a result, the work W can be highly efficiently finished into the aimed shape in a short time period.

When the intermediate shape data Fin is overlapped on the target shape data Ft as depicted in FIG. 9E, in the processing scheduled region WR, the surface Fins in the intermediate shape data Fin pressed by the upper side punch 12a may be positioned on the counter-upper side punch side (on the lower side in FIG. 9E) relative to the surface Fts in the target shape data Ft. The surface Fts in the target shape data Ft may be present between the surface Fins in the intermediate shape data Fin scheduled to be pressed by the upper side punch 12a and the upper side punch 12a.

In this case, in the contour chart, the processing scheduled region WR appears as a region whose necessary deformation amount necessary for deformation from the intermediate shape to the target shape is a negative value. It is therefore difficult for a worker, especially an unexperienced worker to determine how the processing scheduled region WR is pressed even when the worker refers to the contour chart.

The computing apparatus 18 is therefore configured to execute the following processes when the region whose necessary deformation amount is a negative value is present in the contour chart.

Figure 11A:
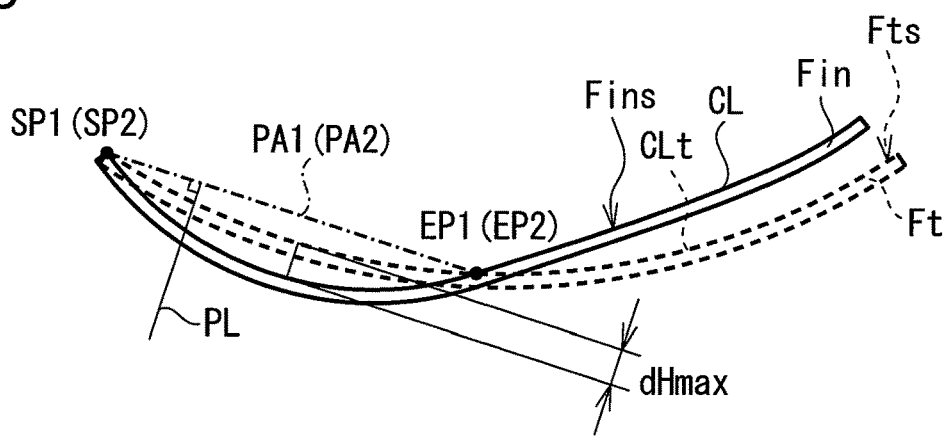
FIG. 11A is a diagram for explaining a parallel translation process of the intermediate shape data.

As depicted in FIG. 11A, a perpendicular line PL relative to the first and the second alignment axes PA1 and PA2 overlapped on each other to align the reference line CLin the intermediate shape data Fin and the target shape data Ft relative to each other is calculated. The perpendicular line PL, the section between the first starting point SP1 and the first ending point EP1 of the reference line CLin, and the section between the second starting point S2 and the second ending point EP2 of the reference line CLt are present on a substantially same plane.

The computing apparatus 18 parallel-translates the intermediate shape data Fin in the direction for the perpendicular line PL to extend in. For example, the computing apparatus 18 relatively parallel-translates the intermediate shape data Fin relative to the target shape data Ft such that the section between the first starting point SP1 and the first ending point EP1 of the reference line CLin in the intermediate shape data Fin is brought into contact with the section between the second starting point SP2 and the second ending point EP2 of the reference line CLt in the target shape data Ft. For example, the maximal distance dHmax between the reference line CLin in the intermediate shape data Fin and the reference line CLt in the target shape data Ft is calculated and the intermediate shape data Fin is parallel-translated by the calculated distance.

Figure 11B:
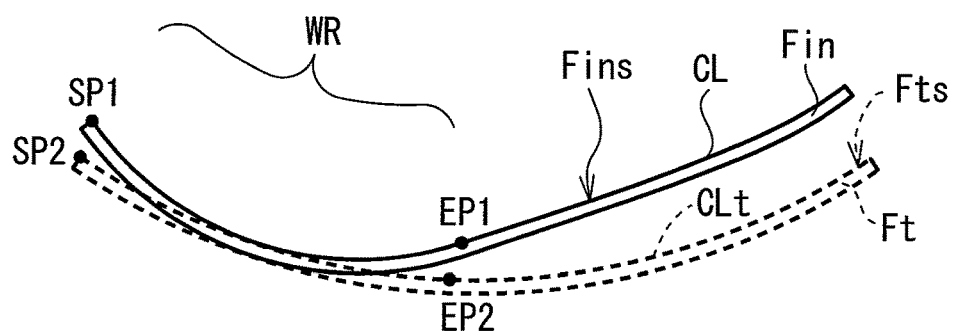
FIG. 11B is a diagram of the intermediate shape data after the parallel translation thereof.

The parallel translation process for the intermediate shape data Fin relative to the target shape data Ft causes the surface Fins in the intermediate shape data Fin scheduled to be pressed by the upper side punch 12a to be positioned on the upper side punch side (on the upper side in FIG. 11B) relative to the surface Fts in the target shape data Ft in the processing scheduled region WR as depicted in FIG. 11B. In the contour chart, the processing scheduled region WR appears as a region whose necessary deformation amount is a positive value. As a result, determination is facilitated for the worker as to how the processing scheduled region WR of the work is pressed based on the contour chart.

An example of the flow of the operations of the computing apparatus 18 of the deformation processing support system 10 described so far will hereinafter be described with reference to a flowchart depicted in FIG. 12.

At step S100, the computing apparatus 18 of the deformation processing support system 10 acquires the target shape data Ft of the work W to be deformation-processed as depicted in FIG. 3.

At step S110, the computing apparatus 18 acquires the 3-D measurement data Fm as depicted in FIG. 4 from the 3-D laser scanner 14 that already executes the 3-D measurement for the work W having the intermediate shape.

At step S120, the computing apparatus 18 acquires the partial shot image Pr of the work Was depicted in FIG. 6 from the camera 16 that already partially shoots the work W having the intermediate shape.

At step S130, the computing apparatus 18 image-processes the shot image Pr by the camera 16 acquired at step S120.

At step S140, the computing apparatus 18 extracts the intersecting lines CL (that is, the first and the second reference lines intersecting each other) from the image-processed shot image Pr and produces the reference line shape data Fcl thereof.

At step S150, as depicted in FIG. 7, the computing apparatus 18 synthesizes the 3-D measurement data Fm of the work W having the intermediate shape acquired at step S110 and the reference line shape data Fcl produced at step S140 with each other to produce the intermediate shape data Fin.

At step S160, the computing apparatus 18 executes the overlapping process of overlapping the intermediate shape data Fin produced at step S150 on the target shape data Ft acquired at step S100.

Figure 13:
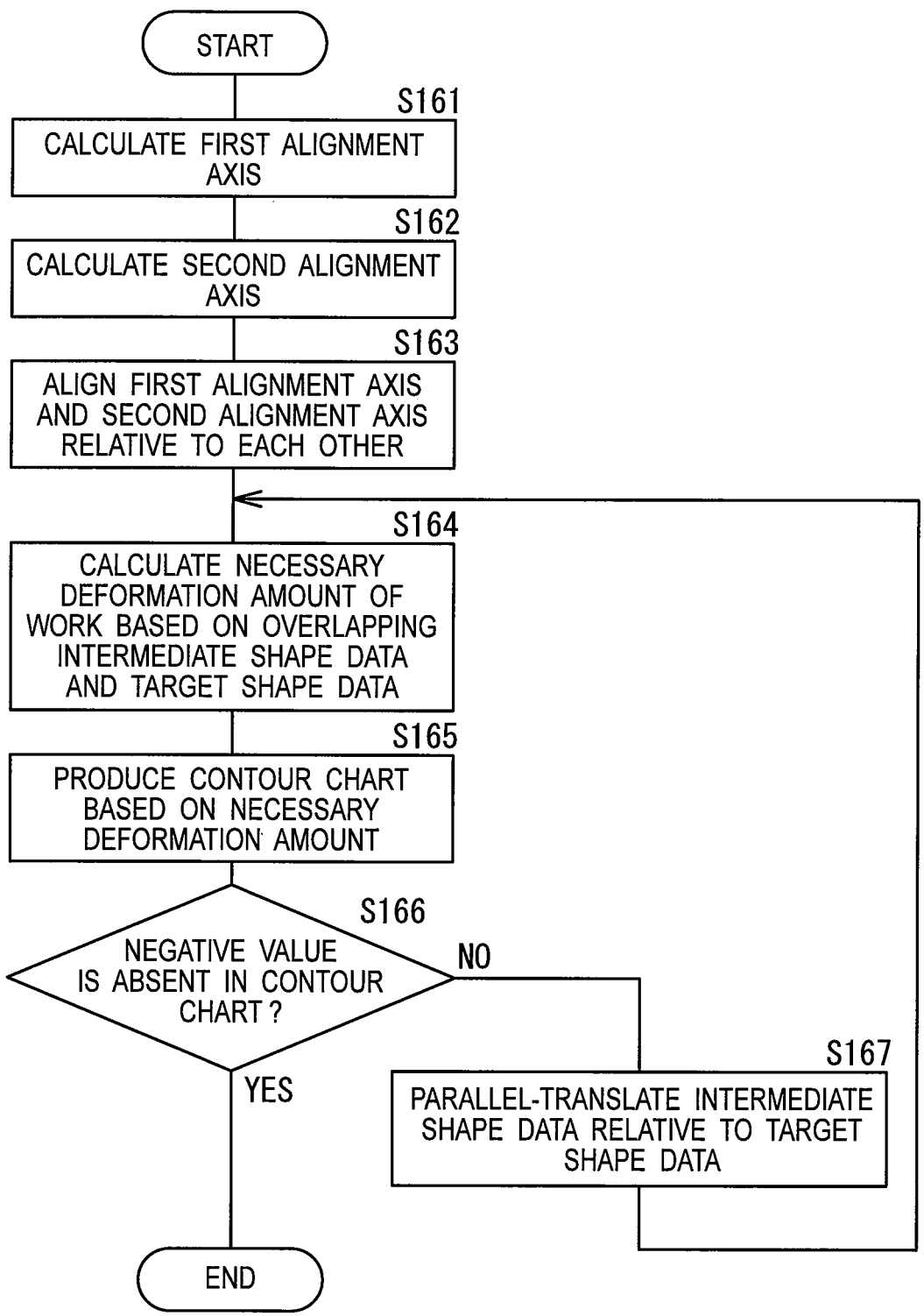
FIG. 13 is a flowchart of an overlapping process for the intermediate shape data on the target shape data.

An example of the flow of the overlapping process will be described with reference to a flowchart depicted in FIG. 13.

At step S161, the computing apparatus 18 calculates the first alignment axis PA1 for the reference line CLin in the intermediate shape data Fin as depicted in FIG. 9B to align the reference line CLin in the intermediate shape data Fin and the corresponding reference line CLt in the target shape data Ft relative to each other.

At step S162, as depicted in FIG. 9D, the computing apparatus 18 calculates the second alignment axis PA2 for the reference line CLt in the target shape data Ft.

At step S163, the computing apparatus 18 aligns the first alignment axis PA1 calculated at step S161 and the second alignment axis PA2 calculated at step S162 relative to each other and, as depicted in FIG. 9E, thereby overlaps the intermediate shape data Fin on the target shape data Ft (executes the best fit process).

At step S164, the computing apparatus 18 calculates the necessary deformation amount necessary for deformation from the intermediate shape to the target shape for each of the plural positions on the work W based on the difference between the intermediate shape data Fin and the target shape data Ft overlapped on each other.

At step S165, the computing apparatus 18 produces the contour chart as depicted in FIG. 10 based on the necessary deformation amount calculated at step S164.

At step S166, the computing apparatus 18 determines whether any region whose necessary deformation amount is a negative value is not present in the contour chart produced at step S166. When the computing apparatus 18 determines that no such region is present, the flow advances to step S170.

On the other hand, when the computing apparatus 18 determines that a region whose necessary deformation amount is a negative value is present in the contour chart, at step S167, the computing apparatus 18 parallel-translates the intermediate shape data Fin relative to the target shape data Ft as depicted in FIG. 11B. The surface Fins in the intermediate shape data Fin is thereby brought into contact with the surface Ft in the target shape data Ft. Returning back to step S164, the necessary deformation amount is again calculated based on the intermediate shape data Fin and the target shape data Ft overlapped on each other after the parallel translation. At step S165, the contour chart is again produced based on the necessary deformation amount that is again calculated.

Figure 12:
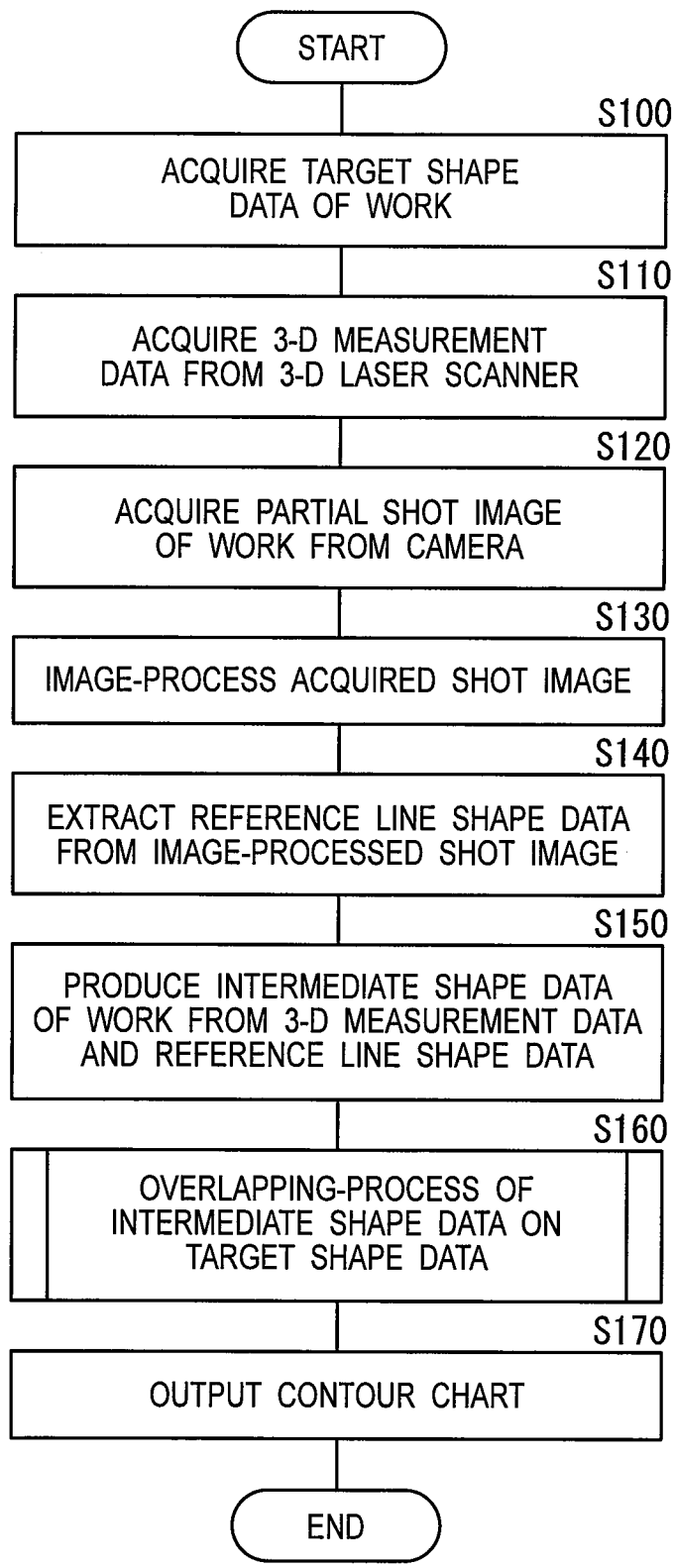
FIG. 12 is a flowchart of an example of the flow of operations of the deformation processing support system.

When the contour chart is produced, as depicted in FIG. 12, at step S170, the computing apparatus 18 outputs the contour chart produced at step S165 to the worker through the output device 20 depicted in FIG. 1.

According to this embodiment, in the deformation processing for the work W, the necessary deformation amount for the work W necessary for deforming into the target shape can be highly precisely calculated in a short time period.

For example, as depicted in FIG. 9E, the first alignment axis PA1 and the second alignment axis PA2 each having a length equal to that of each other are aligned relative to each other. The best fit process of rotating (the reference line CLin in) the intermediate shape data Fin centering the first alignment axis PA1 to thereby overlapping the reference line CLin on the corresponding reference line CLt in the target shape data Ft is thereafter executed. The change of the positional posture of the intermediate shape data Fin for the best fitting is limited to only the rotation centering the first alignment axis PA1 as above, and the intermediate shape data Fin can therefore be highly precisely overlapped on the target shape data Ft in a short time period.

According to this method, to best fit the reference line CLin in the intermediate shape data Fin to the corresponding reference line CLt in the target shape data Ft whose shapes are different from each other, the intermediate shape data Fin can be highly precisely overlapped on the target shape data Ft in a short time period compared to another best fit process for which the change of the positional posture of the reference line CLin is not limited.

In this embodiment, the intermediate shape data Fin as depicted in FIG. 7 is acquired by the reference line shape data producing part 58 of the computing apparatus 18, extracting the reference line from the 3-D measurement data Fm from the 3-D laser scanner 14, the shot image Pr from the camera 16, and the shot image Pr to produce the reference line shape data Fcl, and the intermediate shape data producing part 60 of the computing apparatus 18, producing the intermediate shape data Fin from the 3-D measurement data Fm and the reference line shape data Fcl. These parts function as the intermediate shape data acquiring part.

The intermediate shape data of the work W having a large shape can be produced in a short time period by using the 3-D laser scanner 14 as a means of acquiring the intermediate shape data.

In this embodiment, the contour chart is produced based on the necessary deformation amount for deforming into the target shape for each of the plural positions on the work having the intermediate shape. The worker referring to the contour chart can intuitively learn the information such as the state of the overall work having the intermediate shape, the position to be bending-processed from now on, and the bending-processing amount thereof.

The present invention has been described with reference to the above embodiment while the embodiment of the present invention is not limited to this.

For example, in the embodiment, because the 3-D measurement precision of the 3-D laser scanner 14 is low, that is, any reference line on the work W cannot be detected, the camera 16 is complementarily used as a means to detect the reference line. When the 3-D laser scanner 14 can detect the reference line on the work W, that is, when the reference line appears in the 3-D measurement data, the camera 16 may not be used. The 3-D laser scanner 14 functions as a means of acquiring the intermediate shape data of the work including the reference line.

Concerning the above, the work having the intermediate shape is shot by the camera from plural directions without using any 3-D laser scanner, and the intermediate shape data of the work can be produced based on the plural pieces of shot image data. For example, the computing apparatus includes the intermediate shape data producing part that produces the intermediate shape data by extracting partial shapes of the work from the shot images and synthesizing the pieces of extracted partial shape data into one. In this case, not only the partial shapes of the work but also the shape of the reference line on the work can be extracted from the shot images by the camera. As a result, the intermediate shape data including the reference line on its surface can be acquired.

The deformation processing for the work (the plural bending processing sessions) is(are) executed by a press processing machine in the embodiment while the embodiment of the present invention is not limited to this. For example, the processing may be spinning processing or the like. The embodiment of the present invention relates to deformation processing for a work, that varies the shape of the work without removing any portion thereof, in the broad sense.

The plural reference lines are disposed in the grid form in the target shape data and on the work as depicted in FIG. 3 and FIG. 5 in the embodiment while the embodiment of the present invention is not limited to this. The present invention can be implemented when at least one reference line is present. For any reference line to reliably be present in any optional processing scheduled region to be deformation-processed on the work, the plural reference lines are preferably disposed and are more preferably disposed in the grid form. The target shape data and the intermediate shape data are overlapped on each other by alignment using the reference lines at a position at which no more bending processing can be executed for the reason such as, for example, a small thickness, and the deformation amount can thereby be calculated that is necessary for deforming into the target shape for each of the other positions on the work. The necessary deformation amount in the optional processing scheduled region can highly precisely be calculated as above. The degree of freedom is improved concerning the manner of the deformation processing for the work compared to the case where the reference line is disposed on a portion of the surface of each of the target shape data and the work.

In the embodiment, the processing scheduled region of the work to be deformation-processed next is determined by the worker. The present invention is however not limited to this. For example, defining the region whose necessary deformation amount calculated by the necessary deformation amount calculating part 62 of the computing apparatus 18 is the maximal as the region to be deformation-processed next, the deformation processing for the work can be automated. For example, when the deformation processing for a region of the work is completed, the intermediate shape data acquired from the work is overlapped on the target shape data, and the region including the position on the work whose necessary deformation amount necessary for deforming into the target shape is maximal is determined as the next processing region. The computing apparatus 18 controls the processing machine (such as, for example, the press processing machine 12) and the controlled processing machine automatically deformation-processes the determined processing region. The work can automatically be deformation-processed into the target shape by repeating the above.

An aspect of the present invention is, in the broad sense, a deformation processing support system calculating the necessary deformation amount necessary for deformation from an intermediate shape of a work to a target shape thereof based on the difference between the intermediate shape and the target shape in deformation processing for the work, that includes a target shape data acquiring part that acquires target shape data of the work having a reference line disposed on its surface, an intermediate shape data acquiring part that acquires intermediate shape data from the work having the intermediate shape and having a reference line marked on its surface, during the deformation processing, and a necessary deformation amount calculating part that overlaps the target shape data and the intermediate shape data on each other by aligning the reference lines relative to each other and that calculates a necessary deformation amount for each of plural positions on the work based on the difference between the target shape data and the intermediate shape data overlapped on each other, and of which, as the overlapping of the target shape data and the intermediate shape data on each other, the necessary deformation amount calculating part sets a first starting point and a first ending point on the reference line in the intermediate shape data, calculates a straight-line first alignment axis that connects the first starting point and the first ending point to each other, sets a second starting point corresponding to the first starting point on the reference line in the target shape data, calculates a point on the reference line in the target shape data, that is distant from the second starting point by a distance equal to the length of the first alignment axis, as a second ending point, calculates a straight-line second alignment axis that connects the second starting point and the second ending point to each other, overlaps the intermediate shape data and the target shape data on each other such that the first alignment axis and the second alignment axis are overlapped on each other in the state where the first starting point and the second starting point match with each other, and relatively rotates the intermediate shape data relative to the target shape data centering the first alignment axis and the second alignment axis overlapped on each other.

Another aspect of the present invention is, in the broad sense, a deformation processing support method of calculating a necessary deformation amount necessary for deformation from an intermediate shape of a work to a target shape thereof based on the difference between the intermediate shape and the target shape in deformation processing for the work, that includes the steps of acquiring target shape data of the work having a reference line disposed on its surface, marking a reference line on the surface of the work before the deformation processing is started, acquiring intermediate shape data from the work having the intermediate shape and having the reference line marked on its surface, during the deformation processing, overlapping the target shape data and the intermediate shape data on each other by aligning the reference lines relative to each other, and calculating a necessary deformation amount for each of plural positions on the work having the intermediate shape based on the difference between the target shape data and the intermediate shape data overlapped on each other, and, as the overlapping of the target shape data and the intermediate shape data on each other, setting a first starting point and a first ending point on the reference line in the intermediate shape data, calculating a straight-line first alignment axis that connects the first starting point and the first ending point to each other, setting a second starting point corresponding to the first starting point on the reference line in the target shape data, calculating a point on the reference line in the target shape data, that is distant from the second starting point by a distance equal to the length of the first alignment axis, as a second ending point, calculating a straight-line second alignment axis that connects the second starting point and the second ending point to each other, overlapping the intermediate shape data and the target shape data on each other such that the first alignment axis and the second alignment axis are overlapped on each other in the state where the first starting point and the second starting point match with each other, and relatively rotating the intermediate shape data relative to the target shape data centering the first alignment axis and the second alignment axis overlapped on each other.

The embodiment has been described as above as exemplification of the technique of the present invention. The accompanying drawings and the detailed description have been provided therefor. The constituent elements depicted in the accompanying drawings and described in the detailed description may therefore include not only the constituent elements essential for solving the problem but also the constituent elements not essential for solving the problem to exemplify the technique. The unessential constituent elements should not readily be acknowledged to be essential based on the fact that the unessential constituent elements are depicted in the accompanying drawings and described in the detailed description.

The embodiment is to exemplify the technique of the present invention, and various changes, replacements, additions, omissions, and the like can therefore be made thereto within the scope of the appended claims or the scope of the equivalence thereof.

The entirety of the disclosed content of the specification, drawings, and the appended claims of Japanese Patent Application No. 2017-076003 filed on Apr. 6, 2017 is incorporated herein by reference.

INDUSTRIAL APPLICABILITY

The present invention is applicable to any deformation processing of deforming the shape of a work.

The invention claimed is:

1. A deformation processing support system calculating a necessary deformation amount necessary for deformation from an intermediate shape of a work to a target shape thereof based on a difference between the intermediate shape and the target shape in deformation processing for the work, the deformation processing support system comprising:
a target shape data acquiring part that acquires target shape data of the work having a reference line disposed on a surface thereof;
an intermediate shape data acquiring part that acquires intermediate shape data from the work having the intermediate shape and having a reference line marked on a surface thereof, during the deformation processing; and
a necessary deformation amount calculating part that overlaps the target shape data and the intermediate shape data on each other by aligning the reference lines relative to each other to calculate the necessary deformation amount for each of plural positions on the work based on a difference between the target shape data and the intermediate shape data overlapped on each other, wherein
as the overlapping of the target shape data and the intermediate shape data on each other, the necessary deformation amount calculating part:
sets a first starting point and a first ending point on the reference line in the intermediate shape data;
calculates a straight-line first alignment axis that connects the first starting point and the first ending point;
sets a second starting point corresponding to the first starting point on the reference line in the target shape data;
calculates a point on the reference line in the target shape data, that is distant from the second starting point by a distance equal to a length of the first alignment axis, as a second ending point;
calculates a straight-line second alignment axis that connects the second starting point and the second ending point to each other;
overlaps the intermediate shape data and the target shape data on each other such that the first alignment axis and the second alignment axis are overlapped on each other in the state where the first starting point and the second starting point match with each other; and
relatively rotates the intermediate shape data relative to the target shape data centering the first alignment axis and the second alignment axis overlapped on each other.

2. The deformation processing support system according to claim 1, wherein
the necessary deformation amount calculating part, after overlapping the first alignment axis and the second alignment axis on each other, parallel-translates the intermediate shape data in a direction perpendicular to the first alignment axis overlapped on the second alignment axis such that a section between the first starting point and the first ending point of the reference line in the intermediate shape data is brought into contact with a section between the second starting point and the second ending point of the reference line in the target shape data.

3. The deformation processing support system according to claim 1, further comprising, as the intermediate shape data acquiring part:
a 3-D laser scanner that three-dimensionally measures a shape of the overall work;
a camera that shoots the reference line on the work;
a reference line shape data producing part that extracts the reference line from a shot image by the camera to produce reference line shape data; and
an intermediate shape data producing part that produces the intermediate shape data by synthesizing 3-D measurement data by the 3-D laser scanner and the reference line shape data with each other.

4. The deformation processing support system according to claim 1, further comprising, as the intermediate shape data acquiring part:
a camera that shoots the work having the intermediate shape from plural directions; and
an intermediate shape data producing part that produces the intermediate shape data based on plural pieces of shot image data shot by the camera from the plural directions.

5. The deformation processing support system according to claim 1, further comprising
a contour chart producing part that produces a contour chart based on the necessary deformation amount of each of the plural positions on the work calculated by the necessary deformation amount calculating part.

6. The deformation processing support system according to claim 1, wherein
plural reference lines are disposed by disposing grid lines on the overall surface in the target shape data and on the overall surface of the work.

7. A deformation processing support method of calculating a necessary deformation amount necessary for deformation from an intermediate shape of a work to a target shape thereof based on a difference between the intermediate shape and the target shape in deformation processing for the work, the deformation processing support method comprising the steps of:
   acquiring target shape data of the work having a reference line disposed on a surface thereof;
   marking a reference line on the surface of the work before the deformation processing is started;
   acquiring intermediate shape data from the work having an intermediate shape and having the reference line marked on the surface thereof, during the deformation processing;
   overlapping the target shape data and the intermediate shape data on each other by aligning the reference lines relative to each other; and
   calculating the necessary deformation amount for each of plural positions on the work having the intermediate shape based on a difference between the target shape data and the intermediate shape data overlapped on each other; and
   as the overlapping of the target shape data and the intermediate shape data on each other,
   setting a first starting point and a first ending point on the reference line in the intermediate shape data;
   calculating a straight-line first alignment axis that connects the first starting point and the first ending point;
   setting a second starting point corresponding to the first starting point on the reference line in the target shape data;
   calculating a point on the reference line in the target shape data, that is distant from the second starting point by a distance equal to a length of the first alignment axis, as a second ending point;
   calculating a straight-line second alignment axis that connects the second starting point and the second ending point to each other;
   overlapping the intermediate shape data and the target shape data on each other such that the first alignment axis and the second alignment axis are overlapped on each other in the state where the first starting point and the second starting point match with each other; and
   relatively rotating the intermediate shape data relative to the target shape data centering the first alignment axis and the second alignment axis overlapped on each other.

8. The deformation processing support method according to claim 7, further comprising the step of
   after overlapping the first alignment axis and the second alignment axis on each other, parallel-translating the intermediate shape data in a direction perpendicular to the first alignment axis overlapped on the second alignment axis such that a section between the first starting point and the first ending point of the reference line in the intermediate shape data is brought into contact with a section between the second starting point and the second ending point of the reference line in the target shape data.

9. The deformation processing support method according to claim 7, further comprising the steps of:
   three-dimensionally measuring a shape of the overall work using a 3-D laser scanner;
   shooting the reference line on the work using a camera;
   extracting the reference line from a shot image by the camera to produce reference line shape data; and
   producing the intermediate shape data by synthesizing 3-D measurement data by the 3-D laser scanner and the reference line shape data with each other.

10. The deformation processing support method according to claim 7, further comprising the step of
   producing the intermediate shape data based on plural pieces of shot image data on the work having the intermediate shape shot by a camera from plural directions.

11. The deformation processing support method according to claim 7, further comprising the step of
   producing a contour chart based on the necessary deformation amount calculated for each of the plural positions on the work.

12. The deformation processing support system according to claim 7, wherein
   plural reference lines are disposed by disposing grid lines on an overall surface in the target shape data and on an overall surface of the work.

* * * * *